US011206678B2

(12) United States Patent
Lin

(10) Patent No.: US 11,206,678 B2
(45) Date of Patent: Dec. 21, 2021

(54) METHOD FOR TRANSMITTING INFORMATION, TERMINAL DEVICE, AND NETWORK DEVICE

(71) Applicant: Guangdong OPPO Mobile Telecommunications Corp., Ltd., Guangdong (CN)

(72) Inventor: Yanan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 326 days.

(21) Appl. No.: 16/341,656

(22) PCT Filed: Dec. 30, 2016

(86) PCT No.: PCT/CN2016/113825
§ 371 (c)(1),
(2) Date: Apr. 12, 2019

(87) PCT Pub. No.: WO2018/120159
PCT Pub. Date: Jul. 5, 2018

(65) Prior Publication Data
US 2019/0289619 A1    Sep. 19, 2019

(51) Int. Cl.
*H04W 72/04*    (2009.01)
*H04W 72/12*    (2009.01)
(Continued)

(52) U.S. Cl.
CPC ....... *H04W 72/1268* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS

2007/0147371 A1    6/2007    Radha et al.
2010/0110905 A1*   5/2010    An .................. H04L 1/0002
                                              370/252
(Continued)

FOREIGN PATENT DOCUMENTS

CN    101795436 A    8/2010
CN    102957516 A    3/2013
(Continued)

OTHER PUBLICATIONS

Extended European search report issued in corresponding European application No. 16925761.5 dated Sep. 13, 2019.
(Continued)

*Primary Examiner* — Kodzovi Acolatse
(74) *Attorney, Agent, or Firm* — Young Basile Hanlon & MacFarlane, P.C.

(57) ABSTRACT

A method for transmitting information, a terminal device, and a network device are provided. The method includes: receiving, by a terminal device, a target channel sent by a network device, wherein the target channel includes a broadcast channel or a multicast channel; determining, by the terminal device, to send target information to the network device when a reception result of the target channel meets a prescribed condition; determining, by the terminal device, a target transmission resource for transmitting the target information in at least one transmission resource; and sending, by the terminal device, the target information to the network device on the target transmission resource, wherein the target information sent on the target transmission resource is used for indicating the reception result of the target channel to the network device.

17 Claims, 5 Drawing Sheets

(51) Int. Cl.
  *H04L 1/00*   (2006.01)
  *H04W 72/00*  (2009.01)
  *H04L 1/20*   (2006.01)

(52) U.S. Cl.
  CPC ......... *H04L 1/0026* (2013.01); *H04W 72/042* (2013.01); *H04W 72/0453* (2013.01); *H04L 1/0045* (2013.01); *H04L 1/20* (2013.01); *H04W 72/005* (2013.01)

(56) References Cited

U.S. PATENT DOCUMENTS

| | | | | |
|---|---|---|---|---|
| 2012/0147773 | A1* | 6/2012 | Kim | H04L 1/0025 370/252 |
| 2013/0163444 | A1 | 6/2013 | Tee et al. | |
| 2013/0324145 | A1* | 12/2013 | Tabet | H04L 1/0027 455/452.2 |
| 2015/0172007 | A1* | 6/2015 | Oketani | H04L 1/1893 370/329 |
| 2015/0245326 | A1* | 8/2015 | Rune | H04L 5/006 370/329 |
| 2015/0381448 | A1* | 12/2015 | Cheng | H04W 4/06 370/252 |
| 2016/0191258 | A1* | 6/2016 | Oyman | H04N 21/643 370/312 |
| 2016/0261391 | A1* | 9/2016 | Chen | H04L 1/1861 |
| 2016/0262167 | A1* | 9/2016 | Lan | H04W 72/085 |
| 2017/0325277 | A1* | 11/2017 | Fujishiro | H04W 4/06 |
| 2020/0059935 | A1* | 2/2020 | Qian | H04W 74/02 |

FOREIGN PATENT DOCUMENTS

| | | |
|---|---|---|
| CN | 103096255 A | 5/2013 |
| CN | 105991235 A | 10/2016 |
| CN | 106211086 A | 12/2016 |
| EP | 3065328 A1 | 9/2016 |
| JP | 2009542084 A | 11/2009 |
| WO | 2010024571 A2 | 3/2010 |
| WO | 2016121567 A1 | 8/2016 |

OTHER PUBLICATIONS

English translation of Fourth Chinese Office Action dated May 9, 2020 from Application No. 201680090034.1.
English translation of Third Chinese Office Action dated Mar. 23, 2020 from Application No. 201680090034.1 with Translation.
EPO Examination Report for EP application No. 16925761.5 dated Jun. 5, 2020.
European Examination Report for Application No. 16925761.5 dated Jan. 26, 2021.
Japanese Office Action with English Translation for Application No. 2019-520401 dated Jan. 8, 2021.
Taiwan Office Action with English Translation for Application No. 11020161370 dated Feb. 20, 2021.
First Chinese Office Action dated Dec. 2, 2019 from Application No. 201680090034.1 with Translation.
India Office Action for IN Application 201917016237 dated Oct. 21, 2020.
EP Communication Pursuant to Article 94(3) EPC Examination for EP Application 16925761.5 dated Sep. 30, 2020.

* cited by examiner

METHOD FOR TRANSMITTING INFORMATION, TERMINAL DEVICE, AND NETWORK DEVICE

CROSS-REFERENCE TO RELATED APPLICATION(S)

This application is a 371 application of International Application No. PCT/CN2016/113825, filed on Dec. 30, 2016, the entire disclosure of which is hereby incorporated by reference.

TECHNICAL FIELD

Implementations of the present disclosure relate to the field of wireless communication, and more particularly, relate to a method for transmitting information, a terminal device, and a network device.

BACKGROUND

After sending a broadcast channel or a multicast channel to a terminal device, a network device usually cannot know reception effects of various terminal devices in a system, thus it cannot effectively configure corresponding scheduling information, such as Modulation and Coding Scheme (MCS) level, transmission power, for various terminal devices during scheduling, resulting in poor demodulation performance of channels and low transmission efficiency of the system.

SUMMARY

Implementations of the present disclosure provide a method for transmitting information, a terminal device, and a network device.

In a first aspect, there is provided a method for transmitting information, including: receiving, by a terminal device, a target channel sent by a network device, wherein the target channel includes a broadcast channel or a multicast channel; determining, by the terminal device, to send target information to the network device when a reception result of the target channel meets a prescribed condition; determining, by the terminal device, a target transmission resource for transmitting the target information in at least one transmission resource; and sending, by the terminal device, the target information to the network device on the target transmission resource, wherein the target information sent on the target transmission resource is used for indicating the reception result of the target channel to the network device.

Optionally, in one implementation of the first aspect, the reception result of the target channel includes a quantity N of decoding units that the terminal device fails to decode on the target channel, wherein the decoding units that fail to be decoded are transmission blocks that fail to be decoded, or transmission time units that include transmission blocks that fail to be decoded, N is a positive integer, and the determining, by the terminal device, to send target information to the network device when the reception result of the target channel meets the prescribed condition, includes: when N is greater than or equal to a first threshold, determining, by the terminal device, to send the target information to the network device.

It should be understood that the terminal device may determine to send the target information to the network device when a quantity of decoding units that successively fail to be decoded is greater than or equal to a predetermined threshold.

Optionally, in one implementation of the first aspect, the reception result of the target channel includes a proportion P of the quantity of decoding units that fail to be decoded in at least M decoding units that the terminal device decodes the target channel, wherein the decoding units that fail to be decoded are transmission blocks that fail to be decoded or transmission time units that include transmission blocks that fail to be decoded, M is a positive integer, 0≤P≤1, and the determining, by the terminal device, to send target information to the network device when the reception result of the target channel meets the prescribed condition, includes: determining, by the terminal device, to send the target information to the network device when P is greater than or equal to a second threshold.

Optionally, in one implementation of the first aspect, before the terminal device determines to send the target information to the network device, the method further includes: receiving, by the terminal device, first indication information sent by the network device, wherein the first indication information is used for indicating M.

Here, a value of M may be determined and indicated to the terminal device by the network device, or may be prescribed in advance, for example, in a protocol.

Optionally, in one implementation of the first aspect, the reception result of the target channel includes a modulation and coding scheme (MCS) adjustment amount corresponding to the target channel, and the determining, by the terminal device, to send the target information to the network device when the reception result of the target channel meets the prescribed condition, includes: performing, by the terminal device, a MCS measurement on the target channel; determining, by the terminal device, the MCS adjustment amount according to a measured MCS level and a MCS level used by the target channel; the terminal device determining to send the target information to the network device when the MCS adjustment amount satisfies any one of following conditions: the MCS adjustment amount is not equal to zero; a value of the MCS adjustment amount is non-negative and is greater than or equal to a third threshold; a value of the MCS adjustment amount is negative and is less than or equal to a fourth threshold.

Optionally, in one implementation of the first aspect, the performing, by the terminal device, the MCS measurement on the target channel, includes: performing, by the terminal device, the MCS measurement according to a demodulation reference signal (DMRS) included in the target channel.

Optionally, in one implementation of the first aspect, the determining, by the terminal device, the target transmission resource for transmitting the target information in at least one transmission resource, includes: randomly selecting, by the terminal device, a transmission resource in the at least one transmission resource as the target transmission resource; or determining, by the terminal device, a transmission resource corresponding to a specific parameter of the terminal device in the at least one transmission resource as the target transmission resource, wherein values of specific parameters of different terminal devices are different; or determining, by the terminal device, a transmission resource corresponding to a reception result of the target channel in the at least one transmission resource as the target transmission resource according to the reception result of the target channel and a mapping relationship between reception results of channel and transmission resources; or determining, by the terminal device, a target transmission resource group corresponding to a reception result of the target channel according to the reception result of the target channel and a mapping relationship between reception results of channel and transmission resource groups, and randomly selecting a transmission resource in the target transmission resource group as the target transmission resource, or determining a transmission resource corresponding to a specific parameter of the terminal device as the target transmission resource in the target transmission resource group according to the specific parameter.

The specific parameter is a transmission parameter, a resource parameter, a device parameter, etc. unique to a terminal device, and values of specific parameters of different terminal devices are different. For example, a specific transmission parameter of the terminal device may be an Identity (ID) of the terminal device, or a serial number of a resource used by the terminal device to transmit its control channel, or a serial number of a physical resource block occupied by the terminal device in a communication process, or a value of other parameter used by the terminal device in a transmission process, etc.

The terminal device determines a transmission resource corresponding to a specific parameter of the terminal device as a target transmission resource according to its own specific parameter and a correspondence between predetermined parameter values and transmission resources, and sends the target information to a network device on the target transmission resource.

Optionally, in one implementation of the first aspect, before the terminal device determines the target transmission resource, the method further includes: receiving, by the terminal device, second indication information transmitted by the network device, wherein the second indication information includes information of the at least one transmission resource.

Here, information of at least one transmission resource may be determined and indicated to a terminal device by a network device, or may be prescribed in advance, for example, in a protocol.

Optionally, in one implementation of the first aspect, at least one of a time domain resource, a frequency domain resource, and a code domain resource corresponding to the at least one transmission resource is different, or the time domain resource, the frequency domain resource, and the code domain resource corresponding to the at least one transmission resource are all different.

In the second aspect, there is provided a method for transmitting information, including: sending, by a network device, a target channel to a terminal device, wherein the target channel includes a broadcast channel or a multicast channel; determining, by the network device, the reception result of the target channel according to the target information received on a target transmission resource if the network device receives target information sent by the terminal device according to a reception result of the target channel on the target transmission resource, wherein the target transmission resource is determined by the terminal device in at least one transmission resource.

Optionally, in one implementation of the second aspect, the reception result of the target channel includes a quantity N of decoding units that the terminal device fails to decode on the target channel, wherein the decoding units that fail to be decoded are transmission blocks that fail to be decoded or transmission time units that include transmission blocks that fail to be decoded, and N is a positive integer; determining, by the network device, the reception result of the target channel according to the target information received on the target transmission resource, includes: determining, by the network device, that N is greater than or equal to a first threshold if the network device receives the target information.

Optionally, in one implementation of the second aspect, the reception result of the target channel includes a proportion P of the quantity of decoding units that fail to be decoded in at least M decoding units that the terminal device decodes the target channel, wherein the decoding units that fail to be decoded are transmission blocks that fail to be decoded or transmission time units that include transmission blocks that fail to be decoded, M is a positive integer, $0 \leq P \leq 1$; the determining, by the network device, the reception result of the target channel according to the target information received on the target transmission resource, includes: determining, by the network device, that P is greater than or equal to a second threshold if the network device receives the target information.

Optionally, in one implementation of the second aspect, the method further includes: sending, by the network device, first indication information to the terminal device, wherein the first indication information is used for indicating M.

Optionally, in one implementation of the second aspect, the reception result of the target channel includes a modulation and coding scheme (MCS) adjustment amount corresponding to the target channel, and the determining, by the network device, the reception result of the target channel according to the target information received on the target transmission resource, includes: if the network device receives the target information, determining, by the network device, that the MCS adjustment amount satisfies any one of following conditions: the MCS adjustment amount is not equal to zero; a value of the MCS adjustment amount is non-negative and is greater than or equal to a third threshold; a value of the MCS adjustment amount is negative and is less than or equal to a fourth threshold.

Optionally, in one implementation of the second aspect, the determining, by the network device, the reception result of the target channel according to the target information received on the target transmission resource, includes: determining, by the network device, a reception result of channel corresponding to the target transmission resource as the reception result of the target channel according to the target transmission resource for receiving the target information and a mapping relationship between transmission resources and reception results of channel; or determining, by the network device, a reception result of channel corresponding to a target transmission resource group as the reception result of the target channel according to the target transmission resource group to which the target transmission resource for receiving the target information belongs and a mapping relationship between transmission resource groups and reception results of channel.

Optionally, in one implementation of the second aspect, before the network device receives the target information transmitted by the terminal device according to the reception result of the target channel, the method further includes: sending, by the network device, second indication information to the terminal device, wherein the second indication information includes information of the at least one transmission resource.

Optionally, in one implementation of the second aspect, at least one of a time domain resource, a frequency domain resource, and a code domain resource corresponding to the at least one transmission resource is different, or the time domain resource, the frequency domain resource, and the code domain resource corresponding to the at least one transmission resource are all different.

In a third aspect, there is provided a terminal device that may perform operations of the terminal device in the first aspect or any optional implementation of the first aspect. Specifically, the terminal device may include modules or units used for performing operations of the terminal device in the first aspect or any possible implementation of the first aspect.

In a fourth aspect, there is provided a network device that may perform operations of the network device in the second aspect or any optional implementation of the second aspect. Specifically, the network device may include modules or units used for performing operations of the network device in the second aspect or any possible implementation of the second aspect.

In a fifth aspect, there is provided a terminal device. The terminal device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the terminal device to execute the method in the first aspect or any possible implementation of the first aspect, or the execution causes the terminal device to implement the terminal provided in the third aspect.

In a sixth aspect, there is provided a network device. The network device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the network device to execute the method in the second aspect or any possible implementation of the second aspect, or the execution causes the network device to implement the network device provided in the fourth aspect.

In a seventh aspect, there is provided a computer-readable storage medium storing a program that causes a terminal device to perform a method for transmitting information in any of the first aspect and various implementations thereof.

In an eighth aspect, there is provided a computer-readable storage medium storing a program that causes a network device to perform a method for transmitting information in any of the second aspect and various implementations thereof.

In a ninth aspect, there is provided a system chip, which includes an input interface, an output interface, a processor, and a memory, wherein the processor is used for executing instructions stored in the memory, and when the instructions are executed, the processor may implement the method in any one of the first aspect and various implementations thereof.

In a tenth aspect, there is provided a system chip, which includes an input interface, an output interface, a processor, and a memory, wherein the processor is used for executing instructions stored in the memory, and when the instructions are executed, the processor may implement the method in any one of the second aspect and various implementations thereof.

DETAILED DESCRIPTION

Hereinafter, technical solutions in the implementation of the present disclosure will be described with reference to the accompanying drawings.

It should be understood that the technical solutions of the implementations of the present disclosure may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD) system, a Universal Mobile Telecommunication System (UMTS), and a future 5G communication system.

Various implementations of the present disclosure are described herein in connection with terminal devices. The terminal devices may be referred to as user equipment (UE), access terminals, subscriber units, subscriber stations, mobile stations, mobile platforms, remote stations, remote terminals, mobile devices, user terminals, terminals, wireless communication devices, user agents or user devices. An access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing device connected to a wireless modem, a vehicle-mounted device, a wearable device, a terminal device in a future 5G network, or a terminal device in a future evolved PLMN network, etc.

Various implementations are described herein in connection with network devices. A network device may be a device for communicating with a terminal device, such as a base station (Base Transceiver Station, referred to as "BTS") in a GSM system or CDMA, a base station (NodeB, referred to as "NB") in a WCDMA system, or an evolved base station (Evolutional Node B, referred to as "eNB" or "eNodeB") in a LTE system, or the network device may be a relay station, an access point, a vehicle-mounted device, a wearable device, a network side device in a future 5G network, or a network side device in a future evolved PLMN network.

Figure 1:
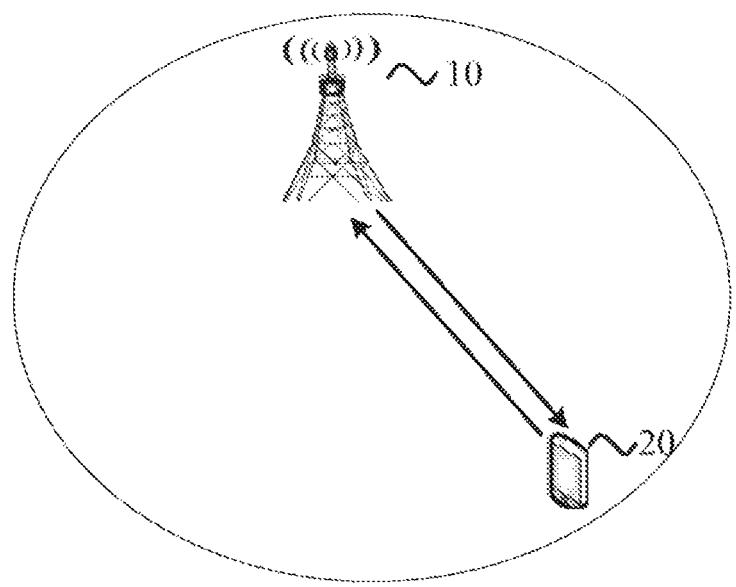
FIG. 1 is a schematic architecture diagram of an application scenario according to an implementation of the present disclosure.

FIG. 1 is a schematic diagram of an application scenario of an implementation of the present disclosure. A communication system in FIG. 1 may include a network device 10 and a terminal device 20. The network device 10 is used for providing communication services for the terminal device 20 and accessing to a core network. The terminal device 20 may access to a network by searching for a synchronization signal or a broadcast signal, etc., sent by the network device 10 to communicate with the network. Arrows shown in FIG.

1 may represent uplink/downlink transmission through cellular links between the terminal device 20 and the network device 10.

The network in the implementation of the present disclosure may refer to a Public Land Mobile Network (PLMN) or a device-to-device (D2D) network or a machine-to-machine/man (M2M) network or other networks. FIG. 1 is a simplified schematic diagram of an example, and other terminal devices may be included in the network and are not shown in FIG. 1.

Figure 2:
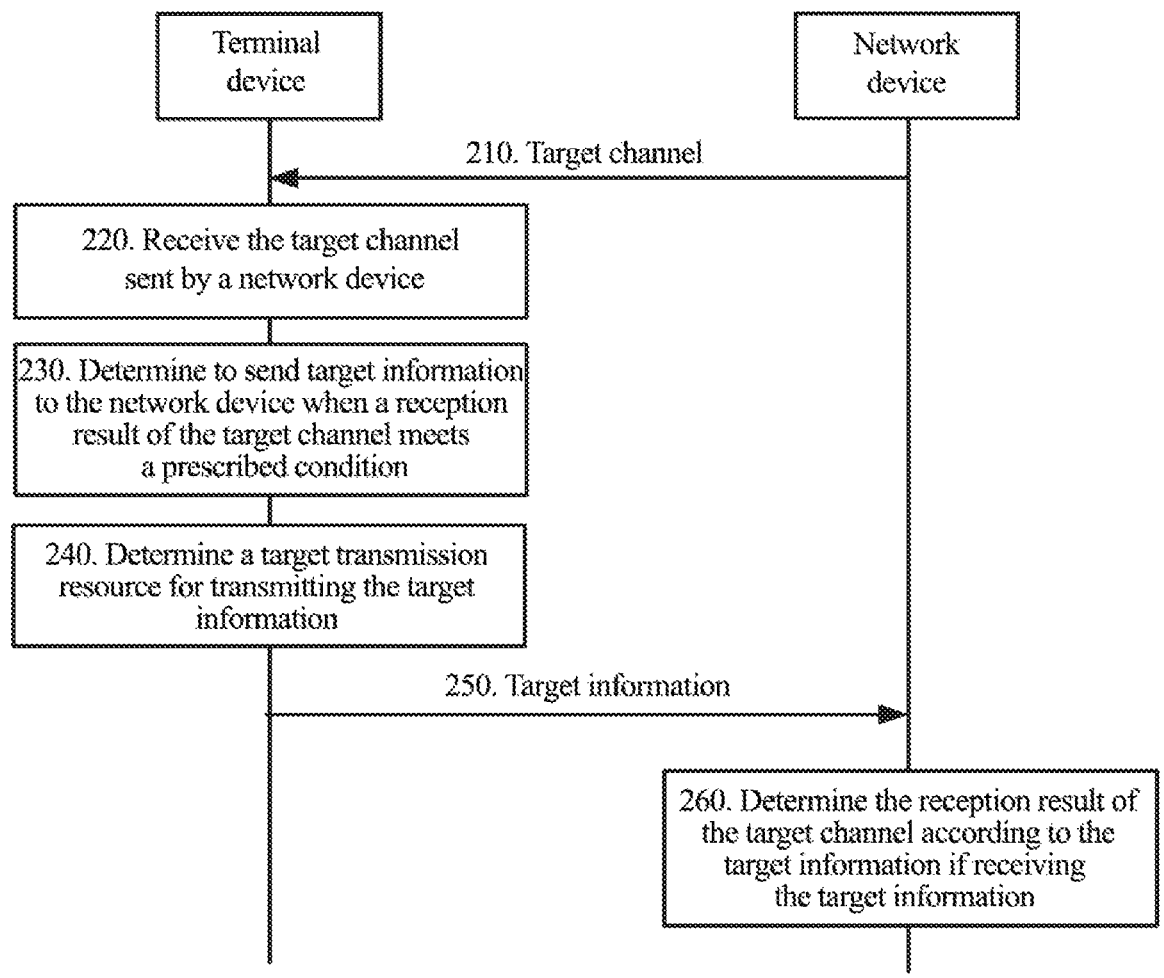
FIG. 2 is a flow interaction diagram of a method for transmitting information according to an implementation of the present disclosure.

FIG. 2 is a flow interaction diagram of a method for transmitting information according to an implementation of the present disclosure. FIG. 2 shows a network device and a terminal device, and the network device may be, for example, the network device 10 shown in FIG. 1, and the terminal device may be, for example, the terminal device 20 shown in FIG. 1. As shown in FIG. 2, a specific flow for transmitting information includes acts 210-260.

In 210, a network device transmits a target channel including a broadcast channel or a multicast channel to a terminal device.

In 220, the terminal device receives the target channel transmitted by the network device.

In 230, the terminal device determines to send target information to the network device when a reception result of the target channel meets a prescribed condition.

Specifically, after receiving the target channel, the terminal device performs reception processing on the target channel, and according to the reception result of the target channel, that is, a reception processing result of the target channel, the terminal device makes a judgment. If the reception result meets the prescribed condition, the terminal device determines to send target information to the network device to indicate a processing result of the target channel to the network device. The implementation of the present disclosure provides three manners to determine transmission of the target information, which are described in detail below.

Manner 1

Optionally, the reception result of the target channel includes a quantity N of decoding units that the terminal device fails to decode on the target channel, wherein the decoding units that fail to be decoded are transmission blocks that fail to be decoded or transmission time units that include transmission blocks that fail to be decoded, and N is a positive integer.

At this time, the terminal device determines to send the target information to the network device when the reception result of the target channel meets the prescribed condition, including: when N is greater than or equal to a first threshold, the terminal device determines to send the target information to the network device.

Specifically, the terminal device decodes the target channel. If the quantity N of decoding units that fail to be decoded is greater than or equal to the first threshold, the terminal device determines that the target information needs to be sent to the network device, to inform the network device.

For example, if the first threshold is 1, it indicates that, when the terminal device decodes the received target channel in units of the decoding units, once the terminal device finds that a decoding unit fails to be decoded, the terminal device sends the target information to the network device.

The decoding units in the implementation of the present disclosure may be transmission blocks, or transmission time units such as subframes, time slots, which is not limited here. The quantity N of transmission units that fail to be decoded may refer to a quantity N of transmission blocks that fail to be decoded on the target channel or a quantity N of transmission time units that include transmission blocks that fail to be decoded. If a plurality of transmission blocks are transmitted in a transmission time unit, a decoding failure of one transmission block of the plurality of transmission blocks represents a decoding failure on the transmission time unit.

For another example, if the first threshold is 5, when the terminal device decodes the target channel, and when a quantity N of decoding units that fail to be decoded reaches to 5, the terminal device sends the target information to the network device to notify the network device. For example, if the terminal device fails to decode a first transmission block, succeeds to decode a second transmission block, fails to decode a third transmission block, succeeds to decode a fourth transmission block, fails to decode a fifth transmission block, fails to decode a sixth transmission block, and fails to decode a seventh transmission block that transmit the target channel, then when a seventh decoding is performed on the seventh transmission block, the N reaches to 5, and the terminal device sends the target information to the network device.

It should be understood that in another case, a terminal device may determine to send target information to a network device when a quantity of decoding units that successively fail to be decoded is greater than or equal to a certain predetermined threshold.

For example, when recording a quantity of decoding units that fail to be decoded, it is required that the decoding units that fail to be decoded are successive. It is still assumed that the terminal device fails to decode a first transmission block, succeeds to decode a second transmission block, fails to decode a third transmission block, succeeds to decode a fourth transmission block, fails to decode a fifth transmission block, fails to decode a sixth transmission block, and fails to decode a seventh transmission block that transmit the target channel, then till a seventh decoding is performed on the seventh transmission block, the quantity of decoding units that successively fail to be decoded is 3. If the terminal device also fails to decode an eighth transmission block and a ninth transmission block, the quantity of decoding units that successively fail to be decoded reaches to 5, and the terminal device sends the target information to the network device.

Manner 2

Optionally, the reception result of the target channel includes a proportion P of a quantity of decoding units failing to be decoded in at least M decoding units decoded by the terminal device on the target channel, wherein the decoding units failing to be decoded are transmission blocks failing to be decoded or transmission time units including transmission blocks failing to be decoded, M is a positive integer, $0 \leq P \leq 1$.

At this time, the terminal device determines to send the target information to the network device when the reception result of the target channel meets the prescribed condition, including: when P is greater than or equal to a second threshold, the terminal device determines to send the target information to the network device.

For example, when the terminal device decodes the target channel, if the proportion P of decoding failures is greater than or equal to the second threshold in successive decoding of at least M transmission blocks, then the terminal device determines to send the target information to the network device, wherein P=(a quantity of transmission blocks that fail to be decoded)/(a total quantity of at least M transmission blocks).

For example, it is assumed that the second threshold is 20% and M=5, when the terminal device decodes the target channel, after decoding five transmission blocks successively, the proportion P of decoding failures in the five times of decoding may be calculated. If P is greater than or equal to 20%, it is determined to send the target information to the network device. For example, after successively decoding five transmission blocks, if the terminal device finds that a quantity of transmission blocks that fail to be decoded in the five times of decoding is 2, it calculates that P=40%≥20%, and it determines to send target information to the network device; if the terminal device finds that the quantity of transmission blocks that fail to be decoded in the five times of decoding is 0, then p=0<20%, and there is no need to send target information.

For another example, it is assumed that the second threshold is 20% and M=5, when a terminal device decodes the target channel, when the terminal device determines that P≥20% is satisfied when one transmission block fails to be decoded, so the terminal device may determine to send target information to a network device after failing to decode the transmission block, thereby feeding back the target information to the network device to feedback channel reception condition; if it finds that a quantity of transmission blocks that fail to be decoded in the five times of decoding is 0, then P=0<20%, it is determined that there is no need to send target information to network device.

Optionally, before the terminal device determines to send the target information to the network device, the method further includes that: the terminal device receives first indication information sent by the network device, and the first indication information is used for indicating M.

Here, the value of M may be determined and indicated to the terminal device by the network device, or may be prescribed in advance, for example, in a protocol.

It should be understood that the reception result of the target channel includes a proportion P of a quantity of decoding units failing to be decoded in at least M decoding units decoded by the terminal device on the target channel. In other words, the terminal device may not only determine a decoding failure proportion P after decoding M transmission blocks successively, but also determine the decoding failure proportion P after decoding more than M transmission blocks. The value of M may be a lower limit value of the quantity of decoded transmission blocks used by the terminal device to calculate P.

Manner 3

Optionally, a reception result of the target channel includes a modulation and coding scheme (MCS) adjustment amount corresponding to the target channel.

At this time, when the reception result of the target channel meets a prescribed condition, the terminal device determines to send target information to the network device, including: the terminal device performs a MCS measurement on the target channel; the terminal device determines the MCS adjustment amount according to a measured MCS level and a MCS level used by the target channel; and when the MCS adjustment amount satisfies at least one of following conditions, the terminal device determines to send the target information to the network device: the MCS adjustment amount is not equal to zero; a value of the MCS adjustment amount is non-negative and is greater than or equal to a third threshold; or the value of the MCS adjustment amount is negative and is less than or equal to a fourth threshold.

Specifically, when a terminal device decodes the target channel, it first performs the MCS measurement on the target channel. For example, the MCS measurement may be performed according to Channel State Information (CSI) included in the target channel or De Modulation Reference Signal (DMRS) included in the target channel. The measured MCS is an ideal required MCS. A terminal device determines the MCS adjustment amount, i.e., the MCS adjustment level, according to a measured MCS level and a MCS level used by the target channel, and determines to send target information to a network device when the MCS adjustment level satisfies a predetermined condition. For example, when the MCS adjustment amount is not equal to zero; or a value of the MCS adjustment amount is non-negative and is greater than or equal to a third threshold; or a value of the MCS adjustment amount is negative and is less than or equal to a fourth threshold.

For example, the predetermined condition satisfied by the MCS adjustment level is that the MCS adjustment amount is not equal to zero, then when the MCS adjustment amount is not equal to zero, a terminal device sends the target information to a network device; when the MCS adjustment amount is equal to 0, there is no need to perform a MCS adjustment, and the terminal device may not send the target information to the network device.

For another example, it is assumed that the MCS adjustment amount is equal to a measured MCS level minus a MCS level used by the target channel. If the value of the MCS adjustment amount is found to be positive after calculation by a terminal device, a terminal device sends the target information to a network device when the value of the MCS adjustment amount is greater than or equal to a third threshold, indicating that the network device may raise the MCS level in subsequent transmission. Further, a quantity of the MCS levels raised by the network device, that is, a raising amount of the MCS levels, may be equal to the third threshold.

For another example, it is assumed that the MCS adjustment amount is equal to a measured MCS level minus a MCS level used by the target channel. If the MCS adjustment amount, i.e., a value of the adjustment level, is negative, a terminal device sends the target information to a network device when a value of the MCS adjustment amount is less than or equal to a fourth threshold, indicating that the network device may reduce a MCS level in subsequent transmission. Further, a quantity of reduced MCS levels, i.e., a reduction amount of MCS levels, may be equal to the fourth threshold. A reason why there are the third threshold and the fourth threshold is that a network device has different sensitivities for raising a MCS level and for reducing the MCS level.

For another example, it is assumed that the MCS adjustment amount is equal to a measured MCS level minus a MCS level used by the target channel. The predetermined condition met by the MCS adjustment amount is that the MCS adjustment amount, that is, a value of the adjustment level, is greater than zero or less than zero. If the terminal device finds that the value of the MCS adjustment amount is greater than zero after calculation, the terminal device sends the target information to the network device, and the target information may indicate that the network device may raise the MCS level in subsequent transmission; if the MCS adjustment amount, i.e., the value of the adjustment level is less than zero, the terminal device sends the target information to the network device, and the target information may indicate that the network device may reduce the MCS level in subsequent transmission.

In 240, the terminal device determines a target transmission resource for transmitting the target information in at least one transmission resource.

Specifically, after determining to send the target information to the network device, the terminal device will determine the target transmission resource for transmitting the target information in at least one transmission resource. The terminal device may specifically determine the target transmission resource in five manners, which will be described in detail below.

Manner 1

The terminal device randomly selects one transmission resource from at least one transmission resource as the target transmission resource.

The at least one transmission resource in act 240 may be, for example, acquired by the terminal device by receiving second indication information sent by the network device. The network device may send the second indication information to the terminal device through, for example, a higher level signaling or downlink control signaling, and the terminal device determines the target transmission resource in the at least one transmission resource according to the at least one transmission resource indicated by the second indication information.

Here, the information of at least one transmission resource may be determined and indicated to the terminal device by the network device, or may be prescribed in advance, for example, in a protocol.

Manner 2

The terminal device determines a transmission resource corresponding to a specific parameter of the terminal device in the at least one transmission resource as the target transmission resource.

The specific parameter is a transmission parameter, a resource parameter, a device parameter, etc. unique to a terminal device, and values of specific parameters of different terminal devices are different. For example, a specific transmission parameter of the terminal device may be an Identity (ID) of the terminal device, or a serial number of a resource used by the terminal device to transmit its control channel, or a serial number of a physical resource block occupied by the terminal device in a communication process, or a value of other parameter used by the terminal device in a transmission process, etc.

A terminal device determines a transmission resource corresponding to a specific parameter of the terminal device as a target transmission resource according to its own specific parameter and a correspondence between predetermined parameter values and transmission resources, and sends the target information to a network device on the target transmission resource.

Manner 3

A terminal device determines a transmission resource corresponding to a reception result of the target channel in the at least one transmission resource as the target transmission resource, according to the reception result of the target channel and a mapping relationship between reception results of channel and transmission resources. The reception result here may be, for example, the reception result in any one of manners 1 to 3 in the foregoing description of act 230.

For example, the reception result of the target channel may include a quantity Q of transmission blocks successively failing to be decoded by the terminal device on the target channel. After failing to decode Q transmission blocks, the terminal device may search for a transmission resource corresponding to a value of Q in at least one transmission resource as the target transmission resource according to Table 1. For example, assuming Q=8, then according to Table 1, transmission resource 2 is the target transmission resource.

TABLE 1

| The quantity Q of transmission blocks that successively fail to be decoded | Transmission resource |
|---|---|
| $4 \leq Q < 8$ | Transmission resource 1 |
| $8 \leq Q < 12$ | Transmission resource 2 |
| $12 \leq Q < 16$ | Transmission resource 3 |
| $Q \geq 16$ | Transmission resource 4 |

For another example, it is assumed that the reception result of the target channel includes, in M transmission blocks decoded by the terminal device on the target channel, a proportion P of a quantity of transmission blocks that fail to be decoded in M decoding units. Then after the terminal device determines P, it may search for a transmission resource corresponding to a value of P in at least one transmission resource as the target transmission resource according to Table 2. For example, assuming P=30%, then according to Table 2, transmission resource 2 is the target transmission resource.

TABLE 2

| The proportion P of decoding failure | Transmission resource |
|---|---|
| $0 < P \leq 25\%$ | Transmission resource 1 |
| $25\% < P \leq 50\%$ | Transmission resource 2 |
| $50\% < P \leq 75\%$ | Transmission resource 3 |
| $75\% < P \leq 90\%$ | Transmission resource 4 |
| $90\% < P \leq 1$ | Transmission resource 5 |

For another example, it is assumed that a reception result of a target channel includes a MCS adjustment level, and the MCS adjustment amount is equal to a level of MCS measured by a terminal device, minus a level of MCS used by the target channel. Then the terminal device may search for a transmission resource corresponding to a value of the MCS adjustment level in at least one transmission resource as the target transmission resource according to Table 3 after determining the MCS adjustment level. For example, assuming that the value of the MCS adjustment level is +2 (i.e., raising two levels), then according to Table 3, transmission resource 3 is the target transmission resource.

TABLE 3

| The value of the MCS adjustment level | Transmission resource |
|---|---|
| −1 (lowering one level) | Transmission resource 1 |
| +1 (raising one level) | Transmission resource 2 |
| +2 (raising two levels) | Transmission resource 3 |
| +3 (raising three levels) | Transmission resource 4 |

Manner 4

A terminal device determines a target transmission resource group corresponding to a reception result of the target channel according to the reception result of the target channel and a mapping relationship between reception results of channel and transmission resource groups. After the terminal device determines the target transmission group, it may randomly select one transmission resource from the target transmission resource group as the target transmission resource; or the terminal device may determine a transmission resource corresponding to a specific parameter of the terminal device as the target transmission resource in the target transmission resource group according to the specific parameter of the terminal device.

The terminal device determines the target transmission resource group in a manner similar to that of the terminal device determining the target transmission resource.

For example, the reception result of the target channel may include a quantity Q of transmission blocks that successively fail to be decoded by the terminal device on the target channel, then the terminal device may search for a transmission resource group corresponding to a value of Q in at least one transmission resource group as the target transmission resource group according to Table 4 after failing to decode the Q transmission blocks for Q times successively. For example, assuming Q=18, according to Table 4, transmission resource group 4 is the target transmission resource group, and the terminal device may randomly select a transmission resource in the transmission resource group 4 as the target transmission resource, or determine a transmission resource corresponding to a specific parameter of the terminal device as the target transmission resource in the target transmission resource group according to the specific parameter of the terminal device.

TABLE 4

| The quantity Q of transmission blocks that successively fail to be decoded | Transmission resource group |
|---|---|
| 4 ≤ Q < 8 | Transmission resource group 1 |
| 8 ≤ Q < 12 | Transmission resource group 2 |
| 12 ≤ Q < 16 | Transmission resource group 3 |
| Q ≥ 16 | Transmission resource group 4 |

For another example, it is assumed that the reception result of the target channel includes, in M transmission blocks decoded by the terminal device on the target channel, a proportion P of a quantity of transmission blocks that fail to be decoded in M decoding units. Then after the terminal device determines P, it may search for a transmission resource group corresponding to a value of P in at least one transmission resource group as the target transmission resource according to Table 5. For example, assuming P=60%, according to Table 5, transmission resource group 3 is the target transmission resource group, and the terminal device may randomly select a transmission resource in the transmission resource group 3 as the target transmission resource, or determine a transmission resource corresponding to a specific parameter of the terminal device as the target transmission resource in the target transmission resource group according to the specific parameter of the terminal device.

TABLE 5

| The proportion P of decoding failure | Transmission resource group |
|---|---|
| 0 < P ≤ 25% | Transmission resource group 1 |
| 25% < P ≤ 50% | Transmission resource group 2 |
| 50% < P ≤ 75% | Transmission resource group 3 |
| 75% < P ≤ 90% | Transmission resource group 4 |
| 90% < P ≤ 1 | Transmission resource group 5 |

For another example, it is assumed that a reception result of a target channel includes a MCS adjustment level, and the MCS adjustment amount is equal to a level of MCS measured by a terminal device, minus a level of MCS used by the target channel. Then the terminal device may search for a transmission resource group corresponding to a value of the MCS adjustment level in at least one transmission resource group as the target transmission resource group according to Table 6, after determining the MCS adjustment level. For example, it is assumed that the value of the MCS adjustment level is +2 (i.e., raising two levels), and then according to Table 6, transmission resource group 3 is the target transmission resource group, and the terminal device may randomly select a transmission resource in the transmission resource group 3 as the target transmission resource, or determine a transmission resource corresponding to a specific parameter of the terminal device as the target transmission resource in the target transmission resource group according to the specific parameter of the terminal device.

TABLE 6

| The value of the MCS adjustment level | Transmission resource group |
|---|---|
| −1 (lowering one level) | Transmission resource group 1 |
| +1 (raising one level) | Transmission resource group 2 |
| +2 (raising two levels) | Transmission resource group 3 |
| +3 (raising three levels) | Transmission resource group 4 |

In 250, the terminal device sends the target information to the network device on the target transmission resource.

After the terminal device determines the target transmission resource for sending the target information, it sends the target information to the network device on the target transmission resource to indicate a reception result of the target channel which is sent by the network device, to the network device.

In 260, if the network device receives the target information sent by the terminal device according to the reception result of the target channel on the target transmission resource, the network device determines the reception result of the target channel according to the target information received on the target transmission resource.

Since the target information is sent by the terminal device on the target transmission resource and the target transmission resource is determined by the terminal device in at least one transmission resource according to the reception result of the target channel, the network device may obtain feedback of the terminal device on the reception result of the target channel according to the target information. Correspondingly, the implementation of the present disclosure provides three manners for the network device to determine the reception result of the target channel, following three manners will be described in detail.

Manner 1

The reception result of the target channel includes a quantity N of decoding units that the terminal device fails to decode on the target channel, wherein the decoding units that fail to be decoded are transmission blocks that fail to be decoded or transmission time units that include transmission blocks that fail to be decoded, and N is a positive integer.

At this time, the network device determines the reception result of the target channel according to the target information received on the target transmission resource, including: if the network device receives the target information, the network device determines that N is greater than or equal to a first threshold.

Manner 2

The reception result of the target channel includes a proportion P of a quantity of decoding units failing to be decoded in at least M decoding units decoded by the terminal device on the target channel, wherein the decoding units failing to be decoded are transmission blocks failing to be decoded or transmission time units including transmission blocks failing to be decoded, M is a positive integer, $0 \leq P \leq 1$.

At this time, the network device determines the reception result of the target channel according to the target information received on the target transmission resource, including: if the network device receives the target information, the network device determines that P is greater than or equal to a second threshold.

Manner 3

The reception result of the target channel includes modulation and coding scheme (MCS) adjustment amount corresponding to the target channel. At this time, the network device determines the reception result of the target channel according to the target information received on the target transmission resource, including: if the network device receives the target information, determining, by the network device, that the MCS adjustment amount satisfies any one of following conditions: the MCS adjustment amount is not equal to zero; a value of the MCS adjustment amount is non-negative and is greater than or equal to a third threshold; the value of the MCS adjustment amount is negative and is less than or equal to a fourth threshold.

It should be understood that the network device determines the reception result of the target channel according to the target information received on the target transmission resource, wherein a relationship between a reception of the target information and a reception result of the target information may be specifically referred to the detailed descriptions in Manners 1 to 3 in the foregoing description about act 230. For the sake of brevity, it will not be repeated here.

It is described above that the network device may determine the reception result of the target channel according to whether the target information is received. For example, when the target information is received, it may be determined that a quantity of transmission blocks successively failing to be decoded is greater than a certain threshold, or that a proportion of decoding failure is greater than a certain threshold. However, if the network device also needs to know specifically the quantity of transmission blocks that successively fail to be decoded and a specific interval in which the proportion of decoding failure is located, the network device may further determine a detailed reception result of the target channel according to the target transmission resources for receiving the target information.

Optionally, the network device determines the reception result of the target channel according to the target information received on the target transmission resource, including: the network device determines a reception result of channel corresponding to a target transmission resource as the reception result of the target channel according to the target transmission resource for receiving the target information and a mapping relationship between transmission resources and reception results of channel; or, the network device determines a reception result of channel corresponding to a target transmission resource group as the reception result of the target channel according to the target transmission resource group to which the target transmission resource for receiving the target information belongs, and a mapping relationship between transmission resource groups and reception results of channel. The reception result here may be, for example, the reception result in any one of manners 1 to 3 in the foregoing description of act 260.

For example, the reception result of the target channel may include a quantity Q of transmission blocks that successively fail to be decoded by the terminal device on the target channel. If the network device receives the target information on the transmission resource 2, it may search out, according to Table 1, that a value corresponding to the transmission resource 2 is 8, and then the network device may know that the quantity Q of transmission blocks that successively fail to be decoded of the target channel satisfies $8 \leq Q < 12$.

For another example, it is assumed that the reception result of the target channel includes, in at least M transmission blocks decoded by the terminal device on the target channel, a proportion P of a quantity of transmission blocks that fail to be decoded in at least M decoding units. If the network device receives the target information on the transmission resource 2, it can find that a proportion of decoding failure of the target channel is $25\% < P \leq 50\%$ according to the mapping relationship shown in Table 2.

For another example, it is assumed that a reception result of a target channel includes a MCS adjustment level, and the MCS adjustment amount is equal to a level of MCS measured by a terminal device, minus a level of MCS used by the target channel. If the network device receives the target information on the transmission resource 3, it can find that the value of the MCS adjustment level is +2 (i.e. raising two levels) according to the mapping relationship shown in Table 3. Therefore, when the network device sends a channel in the future, it may use a MCS level raised by two levels for data transmission.

The network device may determine a reception result of channel corresponding to a target transmission resource group as the reception result of the target channel according to the target transmission resource group to which the target transmission resource for receiving the target information belongs and a mapping relationship between transmission resource groups and reception results of channel. The mapping relationship between the transmission resources and the reception results of channel and the mapping relationship between the transmission resource groups and the reception results of channel may be specifically referred to the detailed descriptions of Manner 3 and Manner 4 in the foregoing description of act 240. For the sake of brevity, it will not be repeated here.

In the implementation of the present disclosure, a terminal device may feedback a channel reception condition for a broadcast channel or a multicast channel to a network device by sending target information to the network device, and the network device can acquire the channel reception condition in time by receiving the target information sent by the terminal device, and the terminal device determines a target transmission resource for sending the target information through the channel reception condition, and sends the target information to the network device on the target transmission resource, so that the network device can determine a specific channel reception condition according to the target transmission resource for receiving the target information. Thus subsequent channel transmission processes may be guided according to a current channel reception condition, and demodulation performance and transmission efficiency of a channel can be obviously improved.

Figure 3:
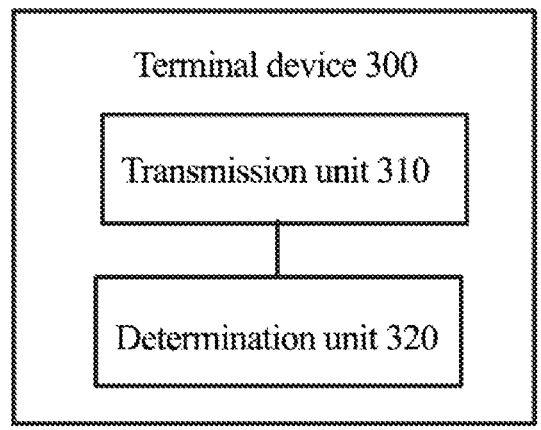
FIG. 3 is a schematic block diagram of a terminal device according to an implementation of the present disclosure.

FIG. 3 is a schematic block diagram of a terminal device 300 according to an implementation of the present disclosure. As shown in FIG. 3, the terminal device 300 includes a transmission unit 310 and a determination unit 320. The transmission unit 310 is used for receiving a target channel sent by a network device, wherein the target channel includes a broadcast channel or a multicast channel; the determination unit 320 is used for determining to send target information to the network device when a reception result of the target channel received by the transmission unit meets a prescribed condition; and determining a target transmission resource for transmitting the target information in at least one transmission resource; the transmission unit 310 is further used for sending the target information to the network device on the target transmission resource determined by the determination unit 320, wherein the target information transmitted on the target transmission resource is used for indicating the reception result of the target channel to the network device.

Therefore, by sending target information to a network device, a terminal device may feedback a channel reception condition for a broadcast channel or a multicast channel to the network device, so that the network device can acquire the channel reception condition in time, thereby guiding subsequent channel transmission processes according to a current channel reception condition, and obviously improving demodulation performance and transmission efficiency of channels.

Optionally, the reception result of the target channel includes a quantity N of decoding units that the terminal device fails to decode on the target channel, wherein the decoding units that fail to be decoded are transmission blocks that fail to be decoded or transmission time units that include transmission blocks that fail to be decoded, and N is a positive integer.

The determination unit 320 is specifically used for determining to send the target information to the network device when N is greater than or equal to a first threshold.

Optionally, the reception result of the target channel includes a proportion P of a quantity of decoding units failing to be decoded in at least M decoding units decoded by the terminal device on the target channel, wherein the decoding units failing to be decoded are transmission blocks failing to be decoded or transmission time units including transmission blocks failing to be decoded, M is a positive integer, $0 \le P \le 1$.

The determination unit 320 is specifically used for determining to send the target information to the network device when P is greater than or equal to a second threshold.

Optionally, the transmission unit 310 is further used for receiving first indication information sent by the network device before the determination unit 320 determines to send target information to the network device, wherein the first indication information is used to indicate M.

Optionally, the reception result of the target channel includes modulation and coding scheme (MCS) adjustment amount corresponding to the target channel, and the determination unit 320 is specifically used for performing a MCS measurement on the target channel; determining the MCS adjustment amount according to a measured MCS level and a MCS level used by the target channel; determining to send the target information to the network device when the MCS adjustment amount satisfies any one of following conditions: the MCS adjustment amount is not equal to zero; a value of the MCS adjustment amount is non-negative and is greater than or equal to a third threshold; a value of the MCS adjustment amount is negative and is less than or equal to a fourth threshold.

Optionally, the determination unit 320 is specifically used for performing the MCS measurement according to a demodulation reference signal (DMRS) included in the target channel.

Optionally, the determination unit 320 is specifically used for randomly selecting one transmission resource from the at least one transmission resource as the target transmission resource; or determining a transmission resource corresponding to a specific parameter of the terminal device in the at least one transmission resource as the target transmission resource, wherein values of specific parameters of different terminal devices are different; or determining a transmission resource corresponding to a reception result of the target channel in the at least one transmission resource as the target transmission resource according to the reception result of the target channel and a mapping relationship between reception results of channel and transmission resources; or determining a target transmission resource group corresponding to a reception result of the target channel according to the reception result of the target channel and a mapping relationship between reception results of channel and transmission resource groups, and randomly selecting a transmission resource in the target transmission resource group as the target transmission resource, or determining a transmission resource corresponding to a specific parameter of the terminal device as the target transmission resource in the target transmission resource group according to the specific parameter.

Optionally, the transmission unit 310 is further used for receiving second indication information sent by the network device before the determination unit 320 determines a target transmission resource, wherein the second indication information includes information of the at least one transmission resource.

Optionally, at least one of a time domain resource, a frequency domain resource, and a code domain resource corresponding to the at least one transmission resource is different, or the time domain resource, the frequency domain resource, and the code domain resource corresponding to the at least one transmission resource are all different.

It should be understood that the terminal device 300 may correspond to the terminal device in the method implementation and may implement the corresponding functions of the terminal device. For the sake of brevity, it will not be repeated here.

Figure 4:
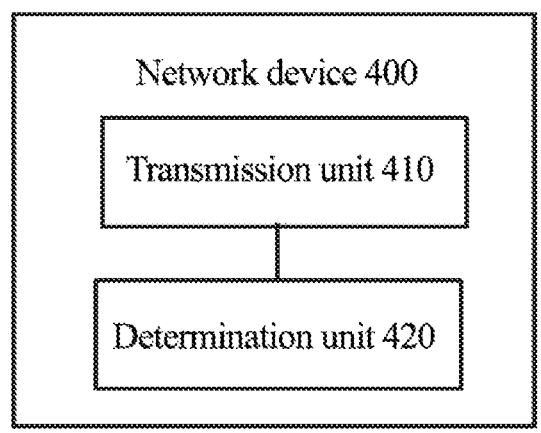
FIG. 4 is a schematic block diagram of a network device according to an implementation of the present disclosure.

FIG. 4 is a schematic block diagram of a network device 400 according to an implementation of the present disclosure. As shown in FIG. 4, the network device 400 includes a transmission unit 410 and a determination unit 420. The transmission unit 410 is used for sending a target channel including a broadcast channel or a multicast channel to a terminal device; the determination unit 420 is used for determining a reception result of the target channel according to target information received on a target transmission resource if the target information sent by the terminal device according to the reception result of the target channel is received on the target transmission resource, wherein the target transmission resource is determined by the terminal device in at least one transmission resource.

Therefore, by receiving target information related to a channel transmission condition, sent by a terminal device, a network device can timely acquire a channel reception condition, thus guiding subsequent channel transmission processes according to a current channel reception condition, and obviously improving demodulation performance and transmission efficiency of channels.

Optionally, the reception result of the target channel includes a quantity N of decoding units that the terminal device fails to decode on the target channel, wherein the decoding units that fail to be decoded are transmission blocks that fail to be decoded or transmission time units that include transmission blocks that fail to be decoded, and N is a positive integer.

The determination unit 420 is specifically used for determining that N is greater than or equal to a first threshold if the transmission unit 410 receives the target information.

Optionally, the reception result of the target channel includes a proportion P of a quantity of decoding units failing to be decoded in at least M decoding units decoded by the terminal device on the target channel, wherein the decoding units failing to be decoded are transmission blocks failing to be decoded or transmission time units including transmission blocks failing to be decoded, M is a positive integer, $0 \leq P \leq 1$.

The determination unit 420 is specifically used for determining that P is greater than or equal to a second threshold if the transmission unit 410 receives the target information.

Optionally, the transmission unit 410 is further used for sending first indication information to the terminal device, and the first indication information is used to indicate M.

Optionally, the reception result of the target channel includes a modulation and coding scheme (MCS) adjustment amount corresponding to the target channel, and the determination unit 420 is specifically used for determining that the MCS adjustment amount satisfies any one of the following conditions if the transmission unit 410 receives the target information: the MCS adjustment amount is not equal to zero; a value of the MCS adjustment amount is non-negative and is greater than or equal to a third threshold; a value of the MCS adjustment amount is negative and is less than or equal to a fourth threshold.

Optionally, the determination unit 420 is specifically used for determining a reception result of channel corresponding to the target transmission resource as the reception result of the target channel according to the target transmission resource for receiving the target information and a mapping relationship between transmission resources and reception results of channel; or determining a reception result of channel corresponding to a target transmission resource group as the reception result of the target channel according to the target transmission resource group to which the target transmission resource for receiving the target information belongs and a mapping relationship between transmission resource groups and reception results of channel.

Optionally, the transmission unit 410 is further used for sending second indication information including information of the at least one transmission resource to the terminal device before receiving the target information sent by the terminal device according to the reception result of the target channel.

Optionally, at least one of a time domain resource, a frequency domain resource, and a code domain resource corresponding to the at least one transmission resource is different, or the time domain resource, the frequency domain resource, and the code domain resource corresponding to the at least one transmission resource are all different.

It should be understood that the network device 400 may correspond to the network device in the method implementation and may implement the corresponding functions of the network device. For the sake of brevity, it will not be repeated here.

Figure 5:
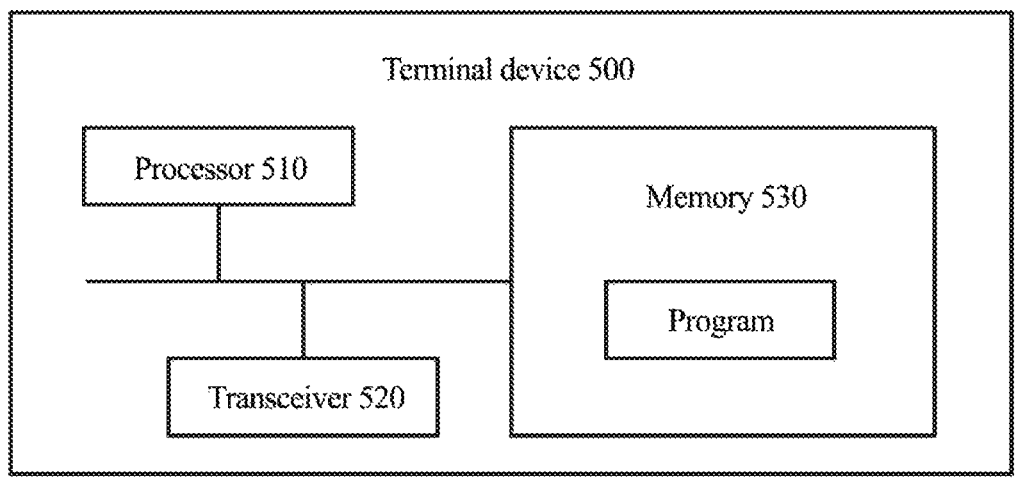
FIG. 5 is a schematic structural diagram of a terminal device according to an implementation of the present disclosure.

FIG. 5 is a schematic structural diagram of a terminal device 500 according to an implementation of the present disclosure. As shown in FIG. 5, the terminal device includes a processor 510, a transceiver 520, and a memory 530, wherein the processor 510, the transceiver 520, and the memory 530 communicate with each other through an internal connection path. The memory 530 is used for storing instructions, and the processor 510 is used for executing instructions stored in the memory 530 to control the transceiver 520 to send or receive signals.

The transceiver 520 is used for receiving a target channel sent by a network device, wherein the target channel includes a broadcast channel or a multicast channel.

The processor 510 is used for determining to send target information to the network device when the reception result of the target channel received by the transceiver 520 meets a prescribed condition; determining a target transmission resource for transmitting the target information in at least one transmission resource.

The transceiver 520 is further used for sending the target information to the network device on the target transmission resource determined by the processor 510, wherein the target information sent on the target transmission resource is used for indicating the reception result of the target channel to the network device.

Optionally, the reception result of the target channel includes a quantity N of decoding units that the terminal device fails to decode on the target channel, wherein the decoding units that fail to be decoded are transmission blocks that fail to be decoded or transmission time units that include transmission blocks that fail to be decoded, and N is a positive integer, and the processor 510 is specifically used for determining to send the target information to the network device when N is greater than or equal to a first threshold.

Optionally, the reception result of the target channel includes a proportion P of a quantity of decoding units that fail to be decoded in at least M decoding units that are decoded by the terminal device on the target channel, wherein the decoding units that fail to be decoded are transmission blocks that fail to be decoded or transmission time units that include transmission blocks that fail to be decoded, M is a positive integer, $0 \leq P \leq 1$, and the processor 510 is specifically used for determining to send the target information to the network device when P is greater than or equal to a second threshold.

Optionally, the transceiver 520 is further used for receiving first indication information sent by the network device before the processor 510 determines to send target information to the network device, wherein the first indication information is used to indicate M.

Optionally, the reception result of the target channel includes a modulation and coding scheme (MCS) adjustment amount corresponding to the target channel, and the processor 510 is specifically used for performing a MCS measurement on the target channel; determining the MCS adjustment amount according to a measured MCS level and a MCS level used by the target channel; determining to send the target information to the network device when the MCS adjustment amount satisfies any one of following conditions: the MCS adjustment amount is not equal to zero; a value of the MCS adjustment amount is non-negative and is greater than or equal to a third threshold; a value of the MCS adjustment amount is negative and is less than or equal to a fourth threshold.

Optionally, the processor 510 is specifically used for performing the MCS measurement according to a demodulation reference signal (DMRS) included in the target channel.

Optionally, the processor 510 is specifically used for randomly selecting one transmission resource from the at least one transmission resource as the target transmission resource; or determining a transmission resource corresponding to a specific parameter of the terminal device in the at least one transmission resource as the target transmission resource, and values of specific parameters of different terminal devices are different; or determining a transmission resource corresponding to a reception result of the target channel in the at least one transmission resource as the target transmission resource according to the reception result of the target channel and a mapping relationship between reception results of channel and transmission resources; or determining a target transmission resource group corresponding to a reception result of the target channel according to the reception result of the target channel and a mapping relationship between reception results of channel and transmission resource groups, and randomly selecting a transmission resource in the target transmission resource group as the target transmission resource, or determining a transmission resource corresponding to a specific parameter of the terminal device as the target transmission resource in the target transmission resource group according to the specific parameter.

Optionally, the transceiver 520 is further used for receiving second indication information sent by the network device before the processor 510 determines a target transmission resource, wherein the second indication information includes information of the at least one transmission resource.

Optionally, at least one of a time domain resource, a frequency domain resource, and a code domain resource corresponding to the at least one transmission resource is different, or the time domain resource, the frequency domain resource, and the code domain resource corresponding to the at least one transmission resource are all different.

It should be understood that in the implementation of the present disclosure, the processor 510 may be a Central Processing Unit (CPU), or the processor 510 may be other general purpose processor, digital signal processor (DSP), application specific integrated circuit (ASIC), Field Programmable Gate Array (FPGA), or other programmable logic device, discrete gate or transistor logic device, discrete hardware component, etc. The general purpose processor may be a microprocessor, or the processor may be any conventional processor or the like.

The memory 530 may include a read only memory and a random access memory and provide instructions and data to the processor 510. A portion of the memory 530 may include a non-volatile random access memory. For example, the memory 530 may store information of device type.

In implementation processes, the acts of the methods described above may be accomplished by integrated logic circuits of hardware in the processor 510 or instructions in a form of software. The acts of the method disclosed in the implementation of the present disclosure may be directly accomplished by an execution of a hardware processor or accomplished by a combination of hardware and software modules in the processor 510. Software modules may be located in mature storage medium in the art such as RAM, flash memory, read-only memory, programmable read-only memory, electrical erasable programmable memory, or registers. The storage medium is located in the memory 530, and the processor 510 reads information in the memory 530 and accomplishes the acts of the method in combination with its hardware. In order to avoid repetition, it will not be described in detail here.

The terminal device 500 according to the implementation of the present disclosure may correspond to the terminal device in the method implementation and the terminal device 300 according to the implementation of the present disclosure, and various units or modules in the terminal device 500 are respectively used for executing various actions or processing processes executed by the terminal device in the method implementation. Here, in order to avoid redundancy, detailed description thereof is omitted.

Figure 6:
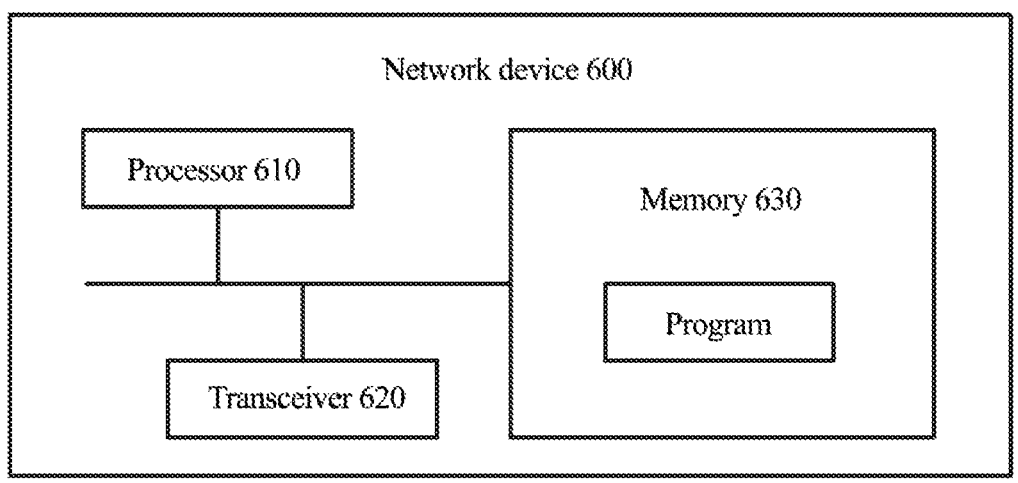
FIG. 6 is a schematic structural diagram of a network device according to an implementation of the present disclosure.

FIG. 6 is a schematic structural diagram of a network device 600 according to an implementation of the present disclosure. As shown in FIG. 6, the terminal device includes a processor 610, a transceiver 620, and a memory 630, wherein the processor 610, the transceiver 620, and the memory 630 communicate with each other through an internal connection path. The memory 630 is used for storing instructions, and the processor 610 is used for executing instructions stored in the memory 630 to control the transceiver 620 to send or receive signals.

The transceiver 620 is used for sending a target channel including a broadcast channel or a multicast channel to a terminal device.

The processor 610 is used for determining a reception result of the target channel according to target information received on a target transmission resource if the target information sent by the terminal device according to the reception result of the target channel is received on the target transmission resource, wherein the target transmission resource is determined by the terminal device in at least one transmission resource.

Optionally, the reception result of the target channel includes a quantity N of decoding units that the terminal device fails to decode on the target channel, wherein the decoding units that fail to be decoded are transmission blocks that fail to be decoded or transmission time units that include transmission blocks that fail to be decoded, and N is a positive integer.

The processor 610 is specifically used for determining that N is greater than or equal to a first threshold if the transceiver 620 receives the target information.

Optionally, the reception result of the target channel includes a proportion P of a quantity of decoding units failing to be decoded in at least M decoding units decoded by the terminal device on the target channel, wherein the decoding units failing to be decoded are transmission blocks failing to be decoded or transmission time units including transmission blocks failing to be decoded, M is a positive integer, $0 \leq P \leq 1$.

The processor 610 is specifically used for determining that P is greater than or equal to a second threshold if the transceiver 620 receives the target information.

Optionally, the transceiver 620 is further used for sending first indication information to the terminal device, wherein the first indication information is used to indicate M.

Optionally, the reception result of the target channel includes a modulation and coding scheme (MCS) adjustment amount corresponding to the target channel, and the processor 610 is specifically used for determining that the MCS adjustment amount satisfies any one of the following conditions if the transceiver 620 receives the target information: the MCS adjustment amount is not equal to zero; a value of the MCS adjustment amount is non-negative and is greater than or equal to a third threshold; a value of the MCS adjustment amount is negative and is less than or equal to a fourth threshold.

Optionally, the processor 610 is specifically used for determining a reception result of channel corresponding to the target transmission resource as the reception result of the target channel according to the target transmission resource for receiving the target information and a mapping relationship between transmission resources and reception results of channel; or determining a reception result of channel corresponding to a target transmission resource group as the reception result of the target channel according to the target transmission resource group to which the target transmission resource for receiving the target information belongs and a mapping relationship between transmission resource groups and reception results of channel.

Optionally, the transceiver 620 is further used for sending second indication information including information of the at least one transmission resource to the terminal device before receiving the target information sent by the terminal device according to the reception result of the target channel.

Optionally, at least one of a time domain resource, a frequency domain resource, and a code domain resource corresponding to the at least one transmission resource is different, or the time domain resource, the frequency domain resource, and the code domain resource corresponding to the at least one transmission resource are all different.

It should be understood that in the implementation of the present disclosure, the processor 610 may be a Central Processing Unit (CPU), or the processor 610 may be other general purpose processor, digital signal processor (DSP), application specific integrated circuit (ASIC), Field Programmable Gate Array (FPGA), or other programmable logic device, discrete gate or transistor logic device, discrete hardware component, etc. The general purpose processor may be a microprocessor, or the processor may be any conventional processor or the like.

The memory 630 may include a read only memory and a random access memory and provide instructions and data to the processor 610. A portion of the memory 630 may include a non-volatile random access memory. For example, the memory 630 may store information of device type.

In implementation processes, the acts of the methods described above may be accomplished by integrated logic circuits of hardware in the processor 610 or instructions in a form of software. The acts of the method disclosed in the implementation of the present disclosure may be directly accomplished by an execution of a hardware processor or accomplished by a combination of hardware and software modules in the processor 610. Software modules may be located in mature storage medium in the art such as RAM, flash memory, read-only memory, programmable read-only memory, electrical erasable programmable memory, or registers. The storage medium is located in the memory 630, and the processor 610 reads information in the memory 630 and accomplishes the acts of the method in combination with its hardware. In order to avoid repetition, it will not be described in detail here.

The network device 600 according to the implementation of the present disclosure may correspond to the network device in the method implementation and the network device 400 according to the implementation of the present disclosure, and various units or modules in the network device 400 are respectively used for executing various actions or processing processes executed by the network device in the method implementation. Here, in order to avoid redundancy, detailed description thereof is omitted.

Figure 7:
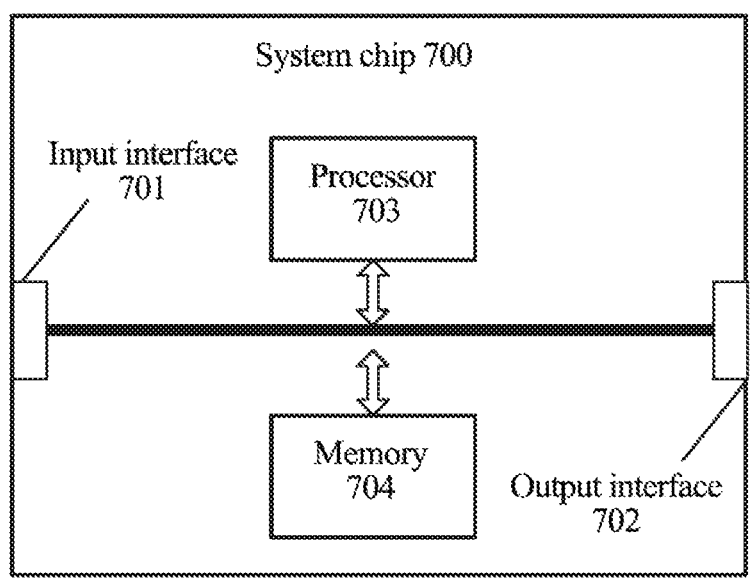
FIG. 7 is a schematic structural diagram of a system chip according to an implementation of the present disclosure.

FIG. 7 is a schematic structural diagram of a system chip according to an implementation of the present disclosure. The system chip 700 of FIG. 7 includes an input interface 701, an output interface 702, at least one processor 703, and a memory 704. The input interface 701, the output interface 702, the processor 703, and the memory 704 are connected to each other through an internal connection path. The processor 703 is used for executing codes in the memory 704.

Optionally, when the codes are executed, the processor 703 may implement the method executed by the terminal device in the method implementation. For the sake of brevity, it will not be repeated here.

Optionally, when the codes are executed, the processor 703 may implement the method executed by the network device in the method implementation. For the sake of brevity, it will not be repeated here.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

Those of ordinary skill in the art will recognize that various exemplary units and algorithm acts described in the implementations disclosed herein may be implemented in electronic hardware, or a combination of computer software and electronic hardware. Whether these functions are performed in hardware or software depends on specific applications and design constraints of the technical solutions. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the system, apparatus and unit described above may refer to the corresponding processes in the aforementioned method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to actual needs to achieve the purpose of solutions of the implementations of the present disclosure.

In addition, various functional units in various implementations of the present disclosure may be integrated in one processing unit, or they may be physically present in each unit alone, or two or more units may be integrated in one unit.

The functions may be stored in a computer readable memory medium if implemented in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device or other devices) to perform all or part of the acts of the method described in various implementations of the present disclosure. The aforementioned storage medium include a U disk, mobile hard disk, read-only memory (ROM), random access memory (RAM), magnetic disk or optical disk and other media that can store program codes.

What are described above are merely exemplary implementations of the present disclosure, but the protection scope of the present disclosure is not limited thereto. Any variation or substitution that can be easily conceived by a person skilled in the art within the technical scope disclosed by the present disclosure shall be included within the protection scope of the present disclosure. Therefore, the scope of protection of the implementations of the present disclosure should be based on the protection scope of the claims.

What I claim is:

1. A method for transmitting information, comprising:
   receiving, by a terminal device, a target channel sent by a network device, wherein the target channel comprises a broadcast channel or a multicast channel;
   determining, by the terminal device, to send target information to the network device when a reception result of the target channel meets a prescribed condition;
   determining, by the terminal device, a target transmission resource for transmitting the target information in at least one transmission resource; and
   sending, by the terminal device, the target information to the network device on the target transmission resource,
   wherein the target information sent on the target transmission resource is used for indicating the reception result of the target channel to the network device,
   wherein determining, by the terminal device, the target transmission resource for transmitting the target information in the at least one transmission resource comprises:
   determining, by the terminal device, a target transmission resource group corresponding to the reception result of the target channel according to the reception result of the target channel and a mapping relationship between reception results of channel and transmission resource groups, and selecting a transmission resource randomly in the target transmission resource group as the target transmission resource.

2. The method according to claim 1, wherein the reception result of the target channel comprises a quantity N of decoding units that the terminal device fails to decode on the target channel, wherein the decoding units that fail to be decoded are transmission blocks that fail to be decoded or transmission time units that comprise transmission blocks that fail to be decoded, and N is a positive integer,
   the determining, by the terminal device, to send the target information to the network device when the reception result of the target channel meets the prescribed condition, comprises:
   determining, by the terminal device, to send the target information to the network device when N is greater than or equal to a first threshold.

3. The method according to claim 1, wherein the reception result of the target channel comprises a proportion P of a quantity of decoding units failing to be decoded in at least M decoding units decoded by the terminal device on the target channel, wherein the decoding units failing to be decoded are transmission blocks failing to be decoded or transmission time units including transmission blocks failing to be decoded, M is a positive integer, $0 \le P \le 1$,
   the determining, by the terminal device, to send the target information to the network device when the reception result of the target channel meets the prescribed condition, comprises:
   determining, by the terminal device, to send the target information to the network device when P is greater than or equal to a second threshold.

4. The method according to claim 3, wherein before the terminal device determines to send the target information to the network device, the method further comprises:
   receiving, by the terminal device, first indication information sent by the network device, wherein the first indication information is used for indicating M.

5. The method according to claim 1, wherein the reception result of the target channel comprises a Modulation and Coding Scheme (MCS) adjustment amount corresponding to the target channel,
   the determining, by the terminal device, to send the target information to the network device when the reception result of the target channel meets the prescribed condition, comprises:
   performing, by the terminal device, a MCS measurement on the target channel;
   determining, by the terminal device, the MCS adjustment amount according to a measured MCS level and a MCS level used by the target channel; and
   determining, by the terminal device, to send the target information to the network device when the MCS adjustment amount satisfies any one of following conditions:
   the MCS adjustment amount is not equal to zero;
   a value of the MCS adjustment amount is non-negative and is greater than or equal to a third threshold; and
   a value of the MCS adjustment amount is negative and is less than or equal to a fourth threshold.

6. The method according to claim 5, wherein the performing, by the terminal device, the MCS measurement on the target channel, comprises:
   performing, by the terminal device, the MCS measurement according to a demodulation reference signal (DMRS) included in the target channel.

7. A terminal device, comprising:
   a transceiver, used for receiving a target channel sent by a network device, wherein the target channel comprises a broadcast channel or a multicast channel; and
   a processor, used for determining to send target information to the network device when a reception result of the target channel received by the transceiver satisfies a prescribed condition,
   wherein the processor is further used for determining a target transmission resource for sending the target information in at least one transmission resource,
   wherein the transceiver is further used for sending the target information to the network device on the target transmission resource determined by the processor,
   wherein the target information sent on the target transmission resource is used for indicating the reception result of the target channel to the network device, and
   wherein the processor is further used for:
   determining a target transmission resource group corresponding to the reception result of the target channel according to the reception result of the target channel and a mapping relationship between reception results of channel and transmission resource groups, and randomly selecting a transmission resource in the target transmission resource group as the target transmission resource.

8. The terminal device according to claim 7, wherein the reception result of the target channel comprises a quantity N of decoding units that the terminal device fails to decode on the target channel, wherein the decoding units that fail to be decoded are transmission blocks that fail to be decoded or transmission time units that comprise transmission blocks that fail to be decoded, and N is a positive integer;
the processor is specifically used for:
determining to send the target information to the network device when N is greater than or equal to a first threshold.

9. The terminal device according to claim 7, wherein the reception result of the target channel comprises a proportion P of a quantity of decoding units failing to be decoded in at least M decoding units decoded by the terminal device on the target channel, wherein the decoding units failing to be decoded are transmission blocks failing to be decoded or transmission time units including transmission blocks failing to be decoded, M is a positive integer, $0 \leq P \leq 1$,
the processor is specifically used for:
determining to send the target information to the network device when P is greater than or equal to a second threshold.

10. The terminal device according to claim 9, wherein the transceiver is further used for:
receiving first indication information sent by the network device before the processor determines to send the target information to the network device, wherein the first indication information is used to indicate M.

11. The terminal device according to claim 7, wherein the reception result of the target channel comprises a Modulation and Coding Scheme (MCS) adjustment amount corresponding to the target channel,
the processor is specifically used for:
performing a MCS measurement on the target channel;
determining the MCS adjustment amount according to a measured MCS level and a MCS level used by the target channel; and
determining to send the target information to the network device when the MCS adjustment amount satisfies any one of following conditions:
the MCS adjustment amount is not equal to zero;
a value of the MCS adjustment amount is non-negative and is greater than or equal to a third threshold; and
a value of the MCS adjustment amount is negative and is less than or equal to a fourth threshold.

12. The terminal device according to claim 11, wherein the processor is specifically used for:
performing the MCS measurement according to a demodulation reference signal (DMRS) included in the target channel.

13. A network device, comprising:
a transceiver, used for sending a target channel including a broadcast channel or a multicast channel to a terminal device; and
a processor, used for determining a reception result of the target channel according to target information received on a target transmission resource based on a determination that the network device receives the target information, which is sent by the terminal device according to the reception result of the target channel, on the target transmission resource, wherein the target transmission resource is determined by the terminal device in at least one transmission resource,
wherein the processor is further used for determining a reception result of channel corresponding to a target transmission resource group as the reception result of the target channel according to the target transmission resource group to which the target transmission resource for receiving the target information belongs and a mapping relationship between transmission resource groups and reception results of channel.

14. The network device according to claim 13, wherein the reception result of the target channel comprises a quantity N of decoding units that the terminal device fails to decode on the target channel, wherein the decoding units that fail to be decoded are transmission blocks that fail to be decoded or transmission time units that comprise transmission blocks that fail to be decoded, and N is a positive integer;
the processor is specifically used for:
determining that N is greater than or equal to a first threshold based on a determination that the transceiver receives the target information.

15. The network device according to claim 13, wherein the reception result of the target channel includes a proportion P of a quantity of decoding units failing to be decoded in at least M decoding units decoded by the terminal device on the target channel, wherein the decoding units failing to be decoded are transmission blocks failing to be decoded or transmission time units including transmission blocks failing to be decoded, M is a positive integer, $0 \leq P \leq 1$;
the processor is specifically used for:
determining that P is greater than or equal to a second threshold based on a determination that the transceiver receives the target information.

16. The device according to claim 15, wherein the transceiver is further used for:
sending first indication information to the terminal device, wherein the first indication information is used for indicating M.

17. The network device according to claim 13, wherein the reception result of the target channel comprises a Modulation and Coding Scheme (MCS) adjustment amount corresponding to the target channel,
the processor is specifically used for:
determining that the MCS adjustment amount satisfies any one of the following conditions based on a determination that the transceiver receives the target information:
the MCS adjustment amount is not equal to zero; a value of the MCS adjustment amount is non-negative and is greater than or equal to a third threshold; and a value of the MCS adjustment amount is negative and is less than or equal to a fourth threshold.

\* \* \* \* \*